Jan. 2, 1923.
D. SCHALK.
LUBRICATING DEVICE FOR PULLEYS.
FILED SEPT. 12, 1921.
1,441,119
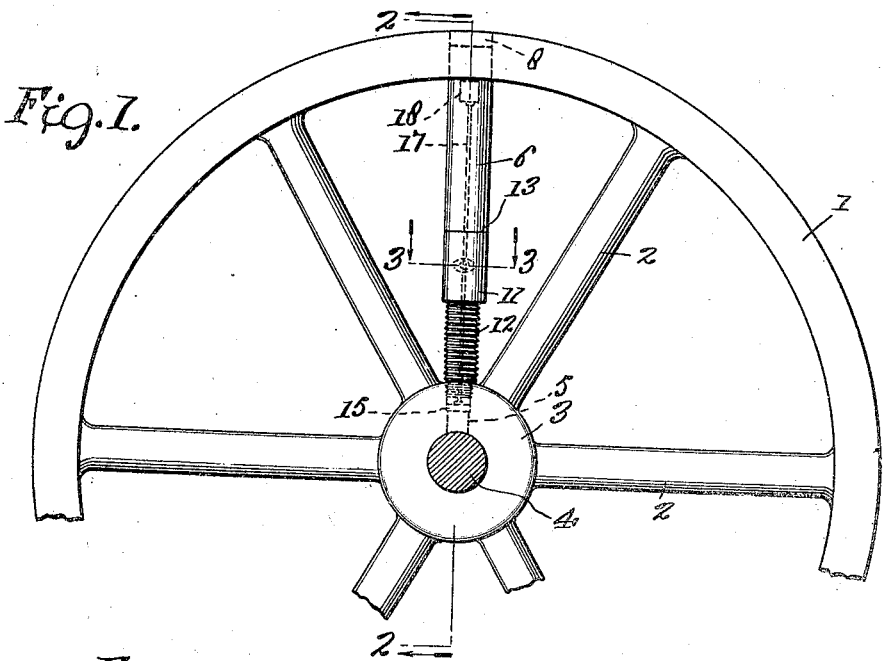
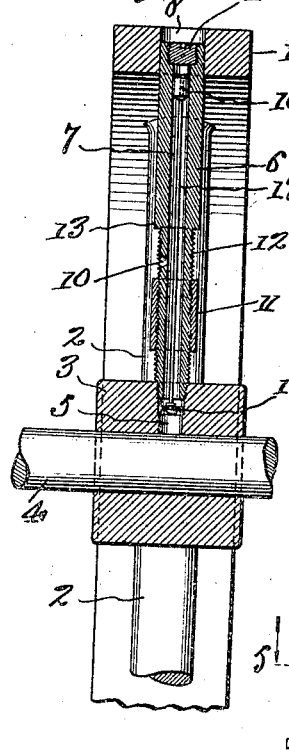
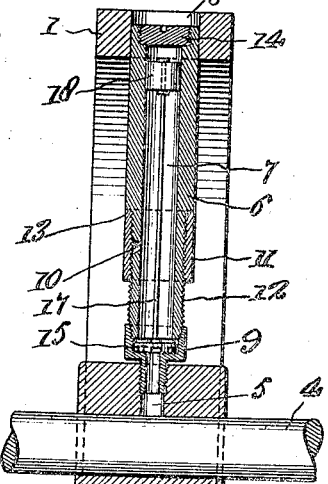
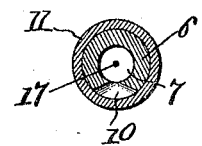
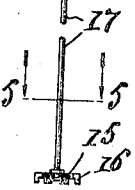
Inventor
David Schalk
by Wilkinson & Fiesta
Attorneys Patented Jan. 2, 1923.

1,441,119

UNITED STATES PATENT OFFICE.

DAVID SCHALK, OF HAMILTON, OHIO.

LUBRICATING DEVICE FOR PULLEYS.

Application filed September 12, 1921. Serial No. 499,957.

*To all whom it may concern:*

Be it known that I, DAVID SCHALK, a citizen of the United States, residing at Hamilton, in the county of Butler and State of Ohio, have invented certain new and useful Improvements in Lubricating Devices for Pulleys; and I do hereby declare the following to be a full, clear, and exact description of the invention, such as will enable others skilled in the art to which it appertains to make and use the same.

The present invention relates to improvements in lubricating devices for pulleys and the like, and has for an object to provide a device adapted to receive a supply of lubricant and hold it in reserve so that it may feed automatically to the hub and shaft of the pulley during the rotation of the latter.

Another object of the present invention resides in providing an improved lubricating attachment for pulleys in which a barrel is provided with a supply chamber or axial bore therein so arranged with respect to a lubricant receiving opening that oil, grease or other like material may be fed into the barrel irrespective of the angular position of the pulley about its shaft.

A further object of the invention resides in providing a simple and inexpensive attachment for pulleys in which the lubricant will be effectively fed to the bearing.

A still further object is to provide means for retaining the lubricant in the hub and on the shaft during high speed revolutions of the pulley, so that there is no danger of injury to the bearing parts at such high rate of speed.

With the foregoing and other objects in view, the invention will be more fully described hereinafter, and will be more particularly pointed out in the claims appended hereto.

In the drawings, wherein like symbols refer to like or corresponding parts throughout the several views, Fig. 1 is a partial side view of a pulley shown equipped with an improved attachment according to the invention;

Fig. 2 is a sectional view taken on the line 2—2 in Fig. 1;

Fig. 3 is a cross sectional view taken on the line 3—3 in Fig. 1;

Fig. 4 is a detail, partly in section, of the hub valve and operating means therefor, Fig. 5 is a transverse section through the valve stem on the line 5—5 of Fig. 4, and looking toward the valve;

Fig. 6 is a fragmentary sectional view showing a slight modification; and,

Fig. 7 is a transverse section similar to Fig. 3, showing a slight modification.

Referring more particularly to the drawing, 1 designates the rim of a pulley of which 2 are the spokes and 3 the hub. The shaft upon which the hub 3 is mounted is indicated at 4, the hub being provided with a radially disposed passage 5 through which lubricant may be admitted to the hub and about the shaft. In accordance with the invention a barrel 6 is made to extend radially between the hub 3 and rim 1 and is made hollow from end to end to provide a radial chamber 7 in which lubricant may be held. For instance, as shown in Figs. 1 and 2, the inner end of the barrel may be reduced and threaded into the passage 5 in the hub 3, and may be slid into place through an opening 8 made in the rim 1.

Alternately, as shown in Fig. 6, a separate socket-shaped piece 9 may be directly threaded into the passage 5 in the hub 3, while the inner end of the barrel is threaded into the socket piece 9. An opening 10 is made through the side of the barrel 6 at any suitable point. The opening is preferably fan shaped, as indicated in Fig. 3, to readily receive the lubricant.

A sleeve 11 is movably mounted upon the exterior surface of the barrel 6, and the barrel 6 at its lower portion and about the opening 10 is preferably reduced and provided with the threads 12 to receive internal threads and the sleeve 11. The sleeve may be thus turned and shifted along the barrel 6 toward and from the opening 10. In Fig. 2 the sleeve 11 is shown as shifted inwardly to expose the opening 10 for the admission of lubricant; while in Figs. 1 and 6 the sleeve 11 is shown to be closed and fits against a shoulder 13 provided by the differential diameters of the barrel. The upper end of the barrel is normally closed by a threaded plug 14 which may be removed to give access from end to end of the barrel for purposes of cleaning. As shown in Fig. 6 the barrel may be of a slightly wider form having a bore of increased diameter to hold a greater supply of lubricant.

When the pulley is turned at a high rate of speed there is a tendency, under centrifugal action, for the lubricant to flow out of the hub 3 and back into the tube 6. To prevent this, a valve 15 is employed and is preferably of disk form, and may be of rubber or other suitable material. The valve 15 is located at the inner end of the tube 6 and is adapted to close against the same to shut off the outward flow of the lubricant. The disk valve 15 preferably has shallow notches or cut-outs 16 in its periphery to permit the free passage of oil into the hub when the valve is open.

To insure closing of the valve 15 when the pulley reaches a rate of high speed, the valve 15 has a valve stem 17 which extends coaxially through the tube 6 and carries a weight 18 on its outer end. The weight 18 is adapted to move outwardly by centrifugal force and draw the valve 15 into closed position, and also is adapted when the pulley stops and the tube 6 is elevated to move the valve 15 into open position.

With a device of this character when the pulley stops in the position indicated in Fig. 1 the sleeve 11 may be turned and lubricant introduced into the opening 10. The lubricant will fall down by gravity into the lower portion of the bore 7 of the barrel and will provide an ample amount of lubricant for a predetermined time. When, however, the pulley stops with the barrel 6 at the lower portion thereof, the supply of lubricant will enter the outer portion of the barrel, and it is immaterial at what point in its rotation the pulley stops.

If desired, the sleeve 11 may have an opening 19 formed in one side thereof so that, upon rotation, the openings 10 of the barrel and 19 of the sleeve may be brought into registry one with the other for introducing a lubricant to the interior of the barrel 6. To close the barrel it is therefore only necessary to give the sleeve 11 a half turn for disposing the openings out of line with each other.

With a device of this kind the sleeve 11 is easily run up and down the threaded portion 12 and may be tightened against the shoulder 13 so as not to become accidentally loosened during the rotation of the pulley, which might permit the escape of lubricant. The sleeve 11 may be run to an open position quickly and a supply of lubricant readily loaded into the barrel, after which the sleeve 11 is returned to closed position and the rotation of the pulley may be continued.

Furthermore, the oil or other lubricant is maintained in the hub 3 by the valve 15 when the pulley is rotated or driven at a high rate of speed, and there cannot be the danger of running dry of the pulley under such conditions.

The device is applicable to pulleys of present construction by the mere insertion of the device as a whole through the opening 8 in the rim 1 thereof.

It is obvious that various changes and modifications may be made in the details of construction and design of the above specifically described embodiment of this invention without departing from the spirit thereof, such changes and modifications being restricted only by the scope of the following claims.

What is claimed is:

1. A lubricating device for pulleys comprising an elongated barrel having a bore extending axially thereof from end to end and being situated between the hub and the rim of the pulley, said barrel having connection with the pulley shaft at its inner end and being provided with an opening intermediate the ends of the barrel, and a sleeve movable longitudinally on the barrel for masking the opening, substantially as described.

2. A lubricating device for pulleys comprising a hollow barrel adapted to be placed between the hub and rim of a pulley and provided with an opening intermediate its ends, said barrel being threaded adjacent the opening and to one side thereof, a sleeve threaded on the barrel and adapted to move axially therealong into and out of masking engagement with the opening, and a removable plug in the outer end of the barrel accessible through the rim of the pulley, substantially as described.

DAVID SCHALK.